United States Patent [19]

Pratt et al.

[11] Patent Number: 5,634,041
[45] Date of Patent: May 27, 1997

[54] RATIONALLY CLOCKED COMMUNICATION INTERFACE

[75] Inventors: Gill A. Pratt, Wellesley; Stephen A. Ward, Chestnut Hill, both of Mass.

[73] Assignee: Massachusetts Institute of Technology, Cambridge, Mass.

[21] Appl. No.: 929,879

[22] Filed: Aug. 12, 1992

[51] Int. Cl.$^6$ .................................................. G06F 1/12
[52] U.S. Cl. .................................................. 395/553
[58] Field of Search ............................ 395/550, 650, 395/700

[56] References Cited

U.S. PATENT DOCUMENTS

| | | | |
|---|---|---|---|
| 4,095,267 | 6/1978 | Morimoto | 395/550 |
| 4,700,347 | 10/1987 | Rettberg et al. | 371/1 |
| 4,851,995 | 7/1989 | Hsu et al. | 395/550 |
| 4,873,703 | 10/1989 | Crandall et al. | 395/550 |
| 5,036,221 | 7/1991 | Brucculeri et al. | 307/443 |
| 5,097,437 | 3/1992 | Larson | 395/775 |
| 5,220,635 | 6/1993 | Kagaya | 395/550 |
| 5,220,659 | 6/1993 | Larson et al. | 395/550 |
| 5,237,676 | 8/1993 | Arimilli et al. | 395/550 |
| 5,256,912 | 10/1993 | Rios | 307/269 |
| 5,305,452 | 4/1994 | Khan et al. | 395/550 |
| 5,313,594 | 5/1994 | Wakerly | 395/550 |
| 5,333,296 | 7/1994 | Bouchard et al. | 395/425 |
| 5,371,880 | 12/1994 | Bhahacharya | 395/550 |
| 5,386,513 | 1/1995 | Tengan | 395/550 |
| 5,392,422 | 2/1995 | Hoel et al. | 395/550 |
| 5,442,772 | 8/1995 | Childs et al. | 395/500 |
| 5,450,572 | 9/1995 | Ruedinger et al. | 395/550 |

FOREIGN PATENT DOCUMENTS 0042924  1/1982  European Pat. Off.

OTHER PUBLICATIONS

Stewart, "A Solution to a Special Case of the Synchronization Problem," Massachusettes Institute of Technology, Sep. 1983.
IBM Technical Disclosure Bulletin, vol. 17, No. 7, Dec. 1974, pp. 2046–2049.
IBM Technical Disclosure Bulletin, vol. 10, No. 11, Apr. 1968, p. 1808.

*Primary Examiner*—Kevin A. Kriess
*Assistant Examiner*—John Q. Chavis
*Attorney, Agent, or Firm*—Hamilton, Brook, Smith & Reynolds, P.C.

[57] ABSTRACT

An interface controlling digital communication between synchronous systems of unequal clock frequency. A phase locked loop generates one clock $F_m$ from the other $F_n$ by locking the phase of the two clocks at a beating period. Within the beating period, a precompiled set of valid and invalid communication clock cycles for each direction of communication are scheduled into lookup tables. The lookup tables generate outputs to a Set of registers for communicating data between the systems of unequal clock frequency.

14 Claims, 5 Drawing Sheets

RATIONALLY CLOCKED COMMUNICATION INTERFACE

BACKGROUND OF THE INVENTION

This invention relates generally to the field of digital communications. Accomplishing digital communication between synchronous systems of unequal clock frequency is difficult. For instance, in a parallel processing network it is necessary that computers with synchronous components be able to communicate with each other. However, in such a network, each processor may have a unique maximum clock frequency that also differs from the maximum clock frequency of the communication network. Communication can be arranged by clocking all processing units at the frequency of the slowest processor. However, this is a poor compromise because maximum performance is only realized by clocking every processing unit at its own maximum frequency.

One approach that has been used for arranging communication between systems having unequal clock frequency is to treat the systems as if they are asynchronous. However, because each of the target systems is ultimately synchronous, probabilistic methods such as synchronizing flip-flops with delayed results must be used to resolve metastable states. This results in imperfect reliability and significant overhead latency.

Another technique that has been used to facilitate communication between synchronous systems of unequal clock frequency is to use an adjustable delay line for selectively adjusting data signals to compensate for uncontrollable phase discrepancies. A disadvantage of this approach is that complex hardware is required.

Other techniques have used shift registers to synchronize the synchronous systems of unequal clock frequency. However, a disadvantage of this approach is that there is a tradeoff between failure rate and propagation delay. More specifically, low synchronization failure rates imply long propagation delays which seriously degrade the performance of the systems.

SUMMARY OF THE INVENTION

Consequently, there is a need to be able to facilitate communication between synchronous systems of unequal frequency without impairing performance of the processors and requiring complex circuitry.

The present invention obtains reliable communications by using the periodic phase relationship between the synchronous systems' unequal clocks to develop predictable periods of time wherein data can be transmitted and received without having timing violations. This allows data to be transmitted between the systems even if the systems are operating at different speeds. Furthermore, information is received without the need for external flow control and framing circuitry. Thus, communication can be performed efficiently despite the unequal clock frequencies.

In accordance with the present invention, there is a data processing system having processing units that operate at different frequencies. The processing units may communicate with each other or through a common network. In order for the processing units to communicate with each other or with the network, a master clock source is used to provide a master clock signal to one of the processing units. A slave clock source associated with each of the other processing units generates a slave clock signal from the master clock signal. Each of the processing units has communications clocked by the master clock signal or a slave clock signal. A predictor is associated with each of the processing units for identifying valid and invalid clock transitions. These transitions are based on the relationship between the slave clock and the master clock signals. A communication register associated with each direction of communications between the processing units is used for communicating data. The register is inhibited when a clock transition is identified as an invalid clock transition by the predictor and enabled when a clock transition is identified as a valid clock transition.

The slave clock source may be generated from the master clock source by a M/N phase locked loop. The M/N phase locked loop defines a rational frequency relationship between the processing units. This allows the present invention to generate one clock from the other. The clock frequencies, $F_m$ and $F_n$, are related by the ratio of two integers M and N. From this relationship, the beating period or locking phase of the clocks is used to schedule a precompiled set of valid and invalid communication clock cycles for transmitting and receiving data between the processing units. Since phase interaction is periodic, this pattern of valid and invalid cycles repeats itself every M clocks for processor M and every N clocks for processor N.

Invalid transmitter clock cycles occur when previously transmitted data in the transmit communication register has not yet been picked up by the receivers. Invalid receiver clock cycles occur when transmitted data has not been preset in the transmit communication register for a sufficiently long time. The identification of valid and invalid cycles prevents the processing units from communicating data during times when metastable states may be generated.

The precompiled set of valid and invalid communication clock cycles are programmed into a predictor. The predictor is preferably a lookup table that is used by the processors to identify valid and invalid periods for transmitting and receiving data. Scheduling is achieved by marking contamination delay and propagation delay points relative to the transmission clock and setup and hold time points relative to the receiving clock. Contamination and propagation delay points represent times between which output data from the communication register is changing and is, thus, unsafe for reception. Setup and hold times define times where the input data to a receiver register cannot change in order to avoid metastable states. The scheduled periods of time for transmission and reception ensure that the processing units communicate in a uniform manner where the unstable time periods of the transmitter and the required stable time periods of the receiver do not overlap.

The communication register receives outputs from the lookup tables and gates information between the processing units according to the respective clock and the lookup table. In particular, the register is clocked by the transmitting unit clock when enabled relative to the transmitting unit clock by the lookup table. The preferred register is an enable-controlled register.

The present invention includes a method for communicating between at least two synchronous processing units of unequal clock frequency. First, a master clock signal is provided. Then a slave clock signal is generated from the master clock signal. Each of the processing units have communications clocked by the master clock signal and the slave clock signal. Then valid and invalid periods for communicating data between the processing units are identified. During valid periods of communication, data is transmitted, whereas during invalid periods of communication, data is inhibited from being communicated.

While the present invention will hereinafter be described in connection with a preferred embodiment and method of use, it will be understood that it is not intended to limit the invention to this embodiment. Instead, it is intended to cover all alternatives, modifications, and equivalents as may be included in the spirit and scope of the present invention as defined by the appended claims.

DETAILED DESCRIPTION OF THE INVENTION

Figure 1:
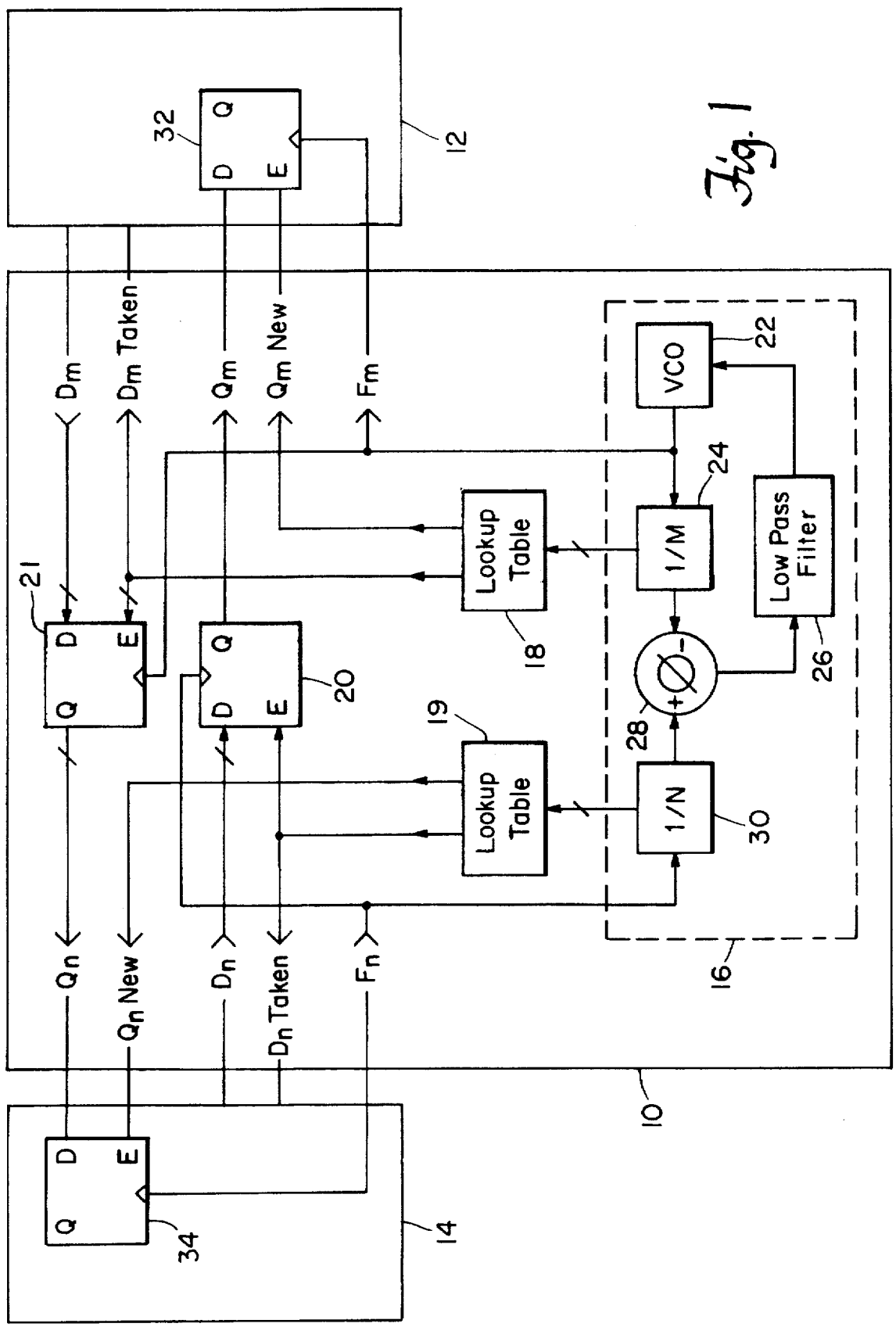
FIG. 1 is a block diagram of the rationally clocked communication interface placed between processors.

Referring to FIG. 1 of the present invention, there is shown a rationally clocked communication interface 10 positioned between two processing units 12 and 14 operating at unequal frequencies. The communication interface includes a phase locked loop 16, lookup tables connected to the phase locked loop, and transmit communication registers 20 and 21 coupled to the lookup tables. The phase locked loop generates one processor's clock ($F_m$) from the other processor's clock ($F_n$). A periodic phase relationship is generated by the phase locked loop and is used to determine times when data can be transmitted and received by the processors. From this relationship, times when data can be received and when data can be transmitted are scheduled into the lookup tables. The lookup tables are then referenced by the processors to facilitate communication. The registers 20 and 21 provide the data lines to gate the data during transmission and reception. The rationally clocked communication interface 10 provides efficient communication regardless of the differing clock frequencies.

The phase locked loop 16 is preferably an M/N phase locked loop that includes a voltage controlled oscillator (VCO) 22 for generating a frequency $F_m$, a divide-by-M counter 24 coupled to the VCO, a divide-by-N counter 30, a phase comparator 28 for determining the phase difference between $F_m$ and $F_n$, and a low pass filter 26 for feeding a signal proportional to the difference detected in the phase comparator to the VCO. The divide-by-N counter and the divide-by-M counter each perform frequency division to establish the proper relationship between $F_m$ and $F_n$. Also, the counters provide a cycle index within each beat period to lookup tables 18 and 19, respectively, for generating local output signals. Each counter counts cycles of its respective input $F_m$, $F_n$ and outputs an overflow pulse to the phase comparator with a count to M or N, respectively. Thus, the pulse train output to the phase comparator has a frequency of $F_m/M$ or $F_n/N$, respectively. The phase comparator drives the phase difference between the signals to zero by driving the frequency output of the VCO, and thus the frequency $F_m$, up or down.

As a result, one clock $F_m$ is generated from the other $F_n$ wherein the clock frequencies are rationally related by the ratio of two integers M and N, wherein $$\frac{F_m}{F_n} = \frac{M}{N}$$

Furthermore, from this ratio, the phase interaction (beating) period of the two clocks, $F_m$ and $F_n$, is derived and defined as $$T_{beat} = \frac{M}{F_m} = \frac{N}{F_n}$$

By locking together the phase of these two clocks, $F_m$ and $F_n$, at this beating period, the phase locked loop insures that divide-by-N and divide-by-M counters overflow at almost precisely the same instant.

Figure 2:
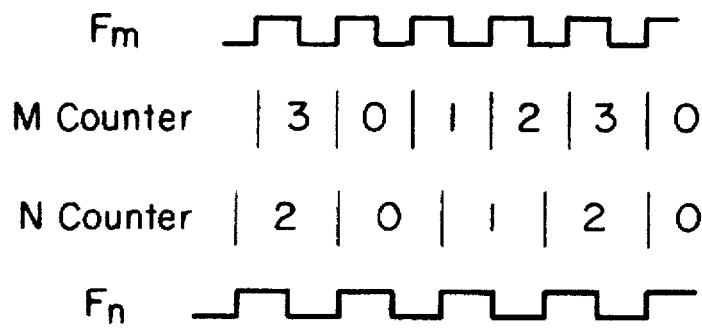
FIG. 2 is an example of a timing graph for the generated clocks.

An example of clocks $F_m$ and $F_n$ generated by the M/N phase locked loop 16 are shown in FIG. 2 along with its cycle index. In this example, M=4 and N=3. The counts of the counters 24 and 30 are reset to zero with each overflow. The M counter resets on the fourth count and the N counter resets on the third count. Both reset together. Within the beat period, the counts of the register counters can be seen to serve as cycle indexes. The pre-compiled set of valid and invalid communication clock cycles can be defined for each processor for each direction of communication. Because the phase interaction is periodic, the pattern of valid and invalid cycles will repeat itself every M clocks for a system m and every N clocks for a system n.

These cycle counts are fed into lookup tables 18 and 19 from the divide-by-M counter 24 and the divide-by-N counter 30. The lookup tables identify periods of valid and invalid clock transitions for clocks $F_m$ and $F_n$ based on their master/slave relationship. The lookup tables use these identified periods of valid and invalid clock transitions to predict valid and invalid times for communicating data between processors 12 and 14 where metastable states of the transmitting and receiving registers do not coincide.

The lookup tables 18 and 19 each generate output signals Q New, D Taken. These signals are based on the identified invalid and valid periods of communication for processors 12 and 14. These data lines are each sent to receive registers 32 and 34 in the control units of the processors and to the communication registers 20 and 21 within the rationally clocked interface 10. More specifically, the D Taken signal is split and used to enable the input of the receive communication registers 20 and 21 and is also sent to the processor's control unit to inform the processors when new data may be placed on the D line, while Q New is used to enable the input of the receive registers 32 and 34. The communication registers 20 and 21, and registers 32 and 34 are preferably enable-controlled registers that function to gate data from processors 12 and 14 in accordance with the cycles established by the lookup tables.

Q New is asserted in synchrony with each processor's clock to identify when new data is available for reception on the Q lines. It is asserted during the receiver's clock cycle just prior to the clock edge on which the Q data line can be safely sampled by the receiving processing system. Thus, for each communicated data word, Q New is active for one cycle only, and the receiving processor system must sample Q on its clock by the end of the indicated cycle. Note that while Q is guaranteed on such cycles to remain stable during the processor's setup and hold period, it may change at other times out of synchrony with the receiver's clock.

The D Taken signal enables the input of the communication registers 20 or 21, and is asserted in synchrony with each transmitting processor's clock when the last data value has been accepted by the receiving processor. At that time, another value may be sent by the transmitting processor. D Taken informs the transmitting processor when it may place new data on the D line. Data is only clocked from the D line through to the Q line on the clock edge of the transmitter following the transmitter clock signal in which D Taken is asserted. Note that because enable-controlled registers are used, the transmitter's D lines may be changed at any time. However, values on the D lines will be ignored on those cycles where D Taken is not asserted.

Controlling D Taken and Q New for the two processors through the lookup tables allows the present invention to achieve three important objectives. First, the receiving processing system is prevented from sampling the local Q lines when they might be changing (i.e., violating any local sample/hold times), thus eliminating the probability of any metastable behavior in the receiver. Secondly, the lookup tables inform the receiving processor when new data is available. This provides framing of incoming data words and prevents under-run. Thirdly, the transmitting processor is informed when previously transmitted data has been accepted. This provides transmit flow control and prevents over-run. Note that the communication latches are each clocked by the transmitting side, so it is impossible to violate setup or hold times on transmission.

Figure 3:
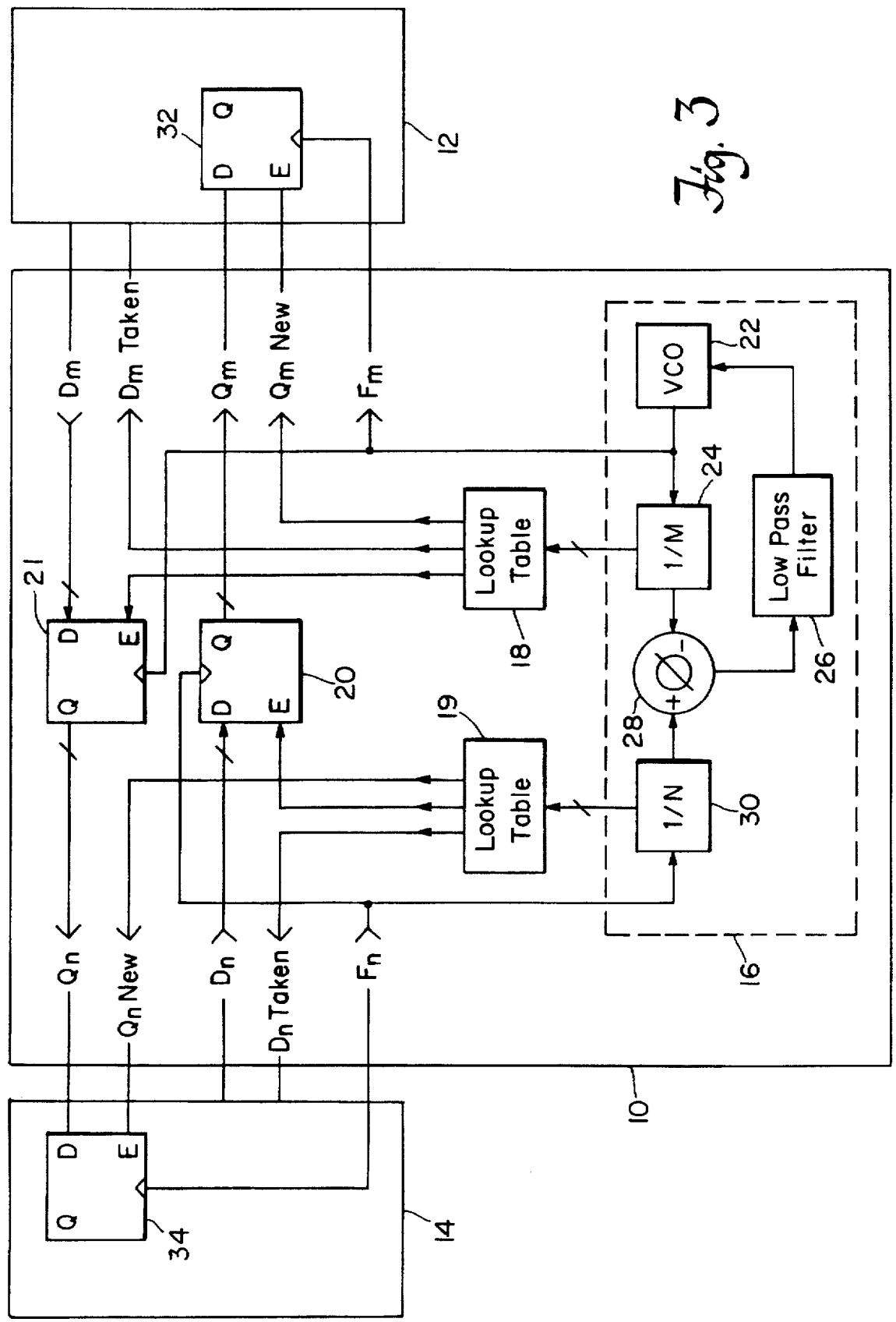
FIG. 3 is second embodiment of the interface.

The D Taken and Q New lines demand near instantaneous reaction by each processor's control circuitry. In practice, most control systems have at least single cycle latency to novel inputs. However, D Taken and Q New are periodic, so their values can be predicted for a future time, alerting each processor several cycles ahead of time as to when new data is available for reception on Q or when new data may be transmitted on D. This is accomplished by splitting D Taken into two lines, one destined for the enable input of communication registers 20 and 21 and the other to the receive registers 32 and 34 of the control logic of the communicating processing system. Instead of splitting D Taken as shown in FIG. 1, two separate D Taken lines can be used (see FIG. 3). In this embodiment, one D Taken line is sent directly to the communication registers 20 and 21 and another is sent to the control units of processors 12 and 14. To coordinate the communication registers with the receiving processor's registers, the contents of the lookup table generating Q New must be rotated in the negative time direction to compensate for whatever reaction latency might exist in the control logic's circuitry. To transmit data to processor 12 from processor 14, the rationally clocked interface would perform in the following manner. First, data is placed on data line $D_n$ at a time period that has been identified by lookup table 19 as being safe for transmission. The data is then held at the input to the communication register 20 until it is enabled and then clocked by an edge of $F_n$. The latched data is then available on the $Q_m$ line as an input to register 32. The register 32 is enabled by Q New and clocked by $F_m$. Processor is notified on line $D_n$ Taken that the processor can transmit more data. If processor 12 were to send data to processor 14, the same procedures would be used except that registers 21 and 34 are in effect.

Figure 4:
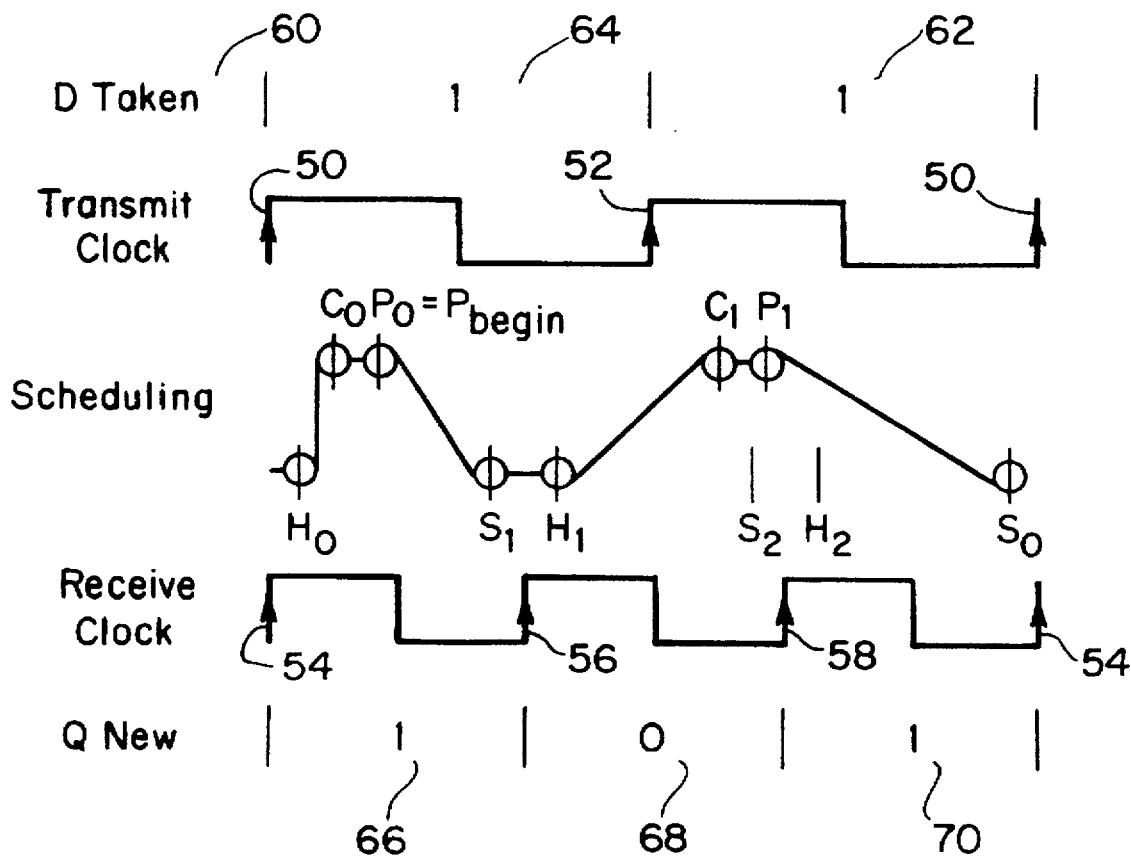
FIG. 4 is an example of a scheduling diagram of the lookup tables.

In order for the above communication (transmission and reception) to occur, it is important that the lookup tables be scheduled to properly assert Q New and D Taken for each direction of communication. An example of a scheduling method for a transmit/receive frequency ratio of 2/3 is shown in FIG. 4 and described below. First, two parallel time lines, one for transmission, the other for reception are drawn. Around each active transmission clock edge, mark the contamination delay and propagation delay points. Contamination time is the earliest time after a clock edge in which old data in the register is no longer present on the transmitter communication register output. The register output for new data is not stable until after the propagation delay. The period of time between the contamination and propagation delay represents a period of time in which the receiver processor cannot receive data because the data is unsettled and can change at any time. Times outside this range are good for reception. For each possible transmit cycle i, label these points $C_i$ and $P_i$. Around each active reception clock edge, mark the setup time and hold time points. The period of time between the sample and hold times represent a time about the receiving clock edge when the data on the Q line must be held stable. That is, the communication register output Q must be stable from a setup time prior to the receiving clock edge until a hold time after the receiver clock edge. For each possible reception cycle j, label these points $S_j$ and $H_j$.

In the example of FIG. 4, the rising edges 50 and 52 of the transmit clock are the edges which will potentially clock the communication register if it is enabled. Note clock edge 50 can be seen at both the beginning and end of the cycle in this modular scheduling at modulo $T_{beat}$. Once a schedule is established for one beat cycle, it is repeated for all subsequent cycles. After the rising edges 50 and 52, the times $C_o$ $P_o$ and $C_1$ $P_1$ have been identified.

The rising edges 54, 56 and 58 of the receive clock are the edges for potentially clocking the receive register if the register is enabled in the prior cycle. Relative to those clock edges, the sample and hold times $S_o$ $H_o$, $S_1$ $Hi_1$, and $S_2$ $H_2$ have been identified. For any of these clock edges to be used to clock the receive register, data must have previously been latched onto the Q line by the communication register 20. That is, the propagation time P relative to a prior edge 50 or 52 must have passed prior to the sample time S. Further, until after the hold time H, the next transmit clock edge 50, 52 cannot be used to clock the communication register where the contamination time C precedes the hold time H.

The scheduling method according to the present invention comprises initially choosing a clock edge at which the communication register will first be clocked. In FIG. 4, edge 50 is selected such that the first propagation time $P_{begin}$ at which stable data is found on the line Q is selected as $P_0$. In order to have data applied to the Q line by the time $P_0$, the edge 50 of the transmit clock must be selected by the lookup table. To that end, the D Taken must be set in the prior cycle 60 of the transmit clock which is cycle 62.

One then looks to the next sample time S which follows time $P_o$ and which allows for the earliest possible reception of the data on line Q. In the example of FIG. 4, that time is $S_1$. To enable the receive register at edge 56, Q new must be set in the prior receive clock cycle 66. That reception is completed at $H_1$.

Then, one looks to the next contamination time $C_1$ which allows the sample hold period $S_1$, $H_1$ to be complete yet which provides for the earliest possible next transmission. In this case, that time is $C_1$ and the transmission is completed at $P_1$. To provide for transmission in the period $C_1$ $P_1$ the clock at 52 must be selected by the lookup table by setting D Taken in the prior cycle 64.

With stable data on the Q line as of P1, the next clock cycle in which the receive register is clocked must be selected. Clock edge 58 cannot be selected because $S_2$ precedes $P_1$. Thus, the rule against overlap of C,P and S,H would be violated. Thus, Q New is not set in the receive clock cycle 68 such that the receive register is not enabled with the receive clock edge 58. The next available receive clock edge is edge 54. It can be seen that $S_o$ follows $P_1$ and $H_o$ precedes $C_o$. Therefore edge 54 can be selected and Q New is set in the prior clock cycle 70. Since the scheduling algorithm has recycled to $C_o$, the schedule is complete and can be repeated for all beat cycles.

It can be seen from FIG. 4 that the lookup table sets D Taken with each cycle of the transmit clock and sets Q New in two out of three cycles. It can be seen that for each enabled transmit clock there is an enabled receive clock. Thus, this algorithm not only prevents any metastable behavior in the receiver but also automatically provides flow control in which all data which is transmitted is received in the same beat cycle. With proper selection of the initial transmit clock edge in defining $P_{begin}$ the number of transmissions which may be made in a beat cycle can be maximized as discussed below.

The example with respect to FIG. 4 illustrates programming of the lookup table for a simple case of M/N =⅔. The following is a generalized algorithm which can be applied to any integers M and N. The key in the generalized algorithm is to identify all full transmission/reception cycles, from P through S,H and C, in a beat cycle, that is, before passing $P_{begin}$ of the next cycle. So long as a full transmission/reception cycle can be established, the D Taken and Q New bits for the clock cycles which precede the P and H times are set. As in the above example, any clock edges which would result in overlap between the unstable periods relative to the transmission and receive clocks are ignored and thus do not result in D Taken or Q New bits being set.

Thus, the generalized algorithm is as follows:

1. Set a time marker at a given propagation point $P_i$ and designate as $P_{begin}$.
2. Advance the time marker to the next earliest $S_j$. If $P_{begin}$ is passed while advancing, a full beat cycle has been completed, then the scheduling is done.
3. Then advance the modular time marker to the next $H_j$. If $P_{begin}$ is passed, the scheduling is done.
4. Next, advance the modular time marker to the next $C_i$. If $P_{begin}$ is passed, the scheduling is done.
5. Then set, the D Taken bit associated with transmit point $P_i$, so that transmission will result in new data available at time $P_i$. Also, set the Q New bit associated with the receive cycle j so that reception of new data will finish by time $H_j$.
6. Then advance the time marker to the next $P_i$. If $P_{begin}$ is passed, then the scheduling is done.
7. Go to step 2.

This process continues until scheduling is done by passing the initial P marker.

The scheduling described above is performed in O(n) time. Note that the scheduling of the lookup tables has optimal throughput given a certain starting transmit cycle, because it schedules all communications at the earliest possible moment, leaving the most time free in the remainder of $T_{beat}$ for further communication. The choice of first transmit interval, however, can substantially effect performance. In a worst case scenario, a trial scheduling can be done for all possible starting transmit intervals, and the most optimal schedule chosen. This results in scheduling being performed in $O(n^2)$ time.

However, optimality does not actually require that scheduling be done in $O(n^2)$ time. The choice of a starting point is better thought of as finding any of the transmit cycles which are actually utilized by an optimal throughput schedule (i.e., ones that have D Taken set in the previous cycle). Because the above scheduling operates identically on each iteration, and stops only when the original $P_{begin}$ is passed, starting at any transmit cycle utilized by an optimal schedule will result in an identical, optimal schedule. Thus, finding an optimal starting point is as easy as choosing any one of the transmit cycles that are utilized by any optimal schedule.

A transmit cycle can be determined by choosing the $P_i$ which has the least time margin to the next $S_j$. This choice forces a communications datum to be transferred from transmitter to receiver with the least possible latency, leaving the most time during the remainder of $T_{beat}$ for other data transfers. As a result, an optimal schedule is created. Using a brute force search, the determination of the smallest $P_i$ to $S_j$ margin can be done in O(n) time. With modular arithmetic, the determination can be done in constant time, but the entire scheduling process still remains O(n). In the example of FIG. 4, the shortest time between any PS point is between $P_o$ and $S_1$, so $P_o$ is selected as $P_{begin}$.

The setup, hold, contamination, and propagation times used in the scheduling are a dimensionless fraction of the transmit or receive cycles. Thus, all of these numbers tend to scale with the minimum clock period so that a lookup table can be scheduled regardless of the actual operating frequency.

Figure 5:
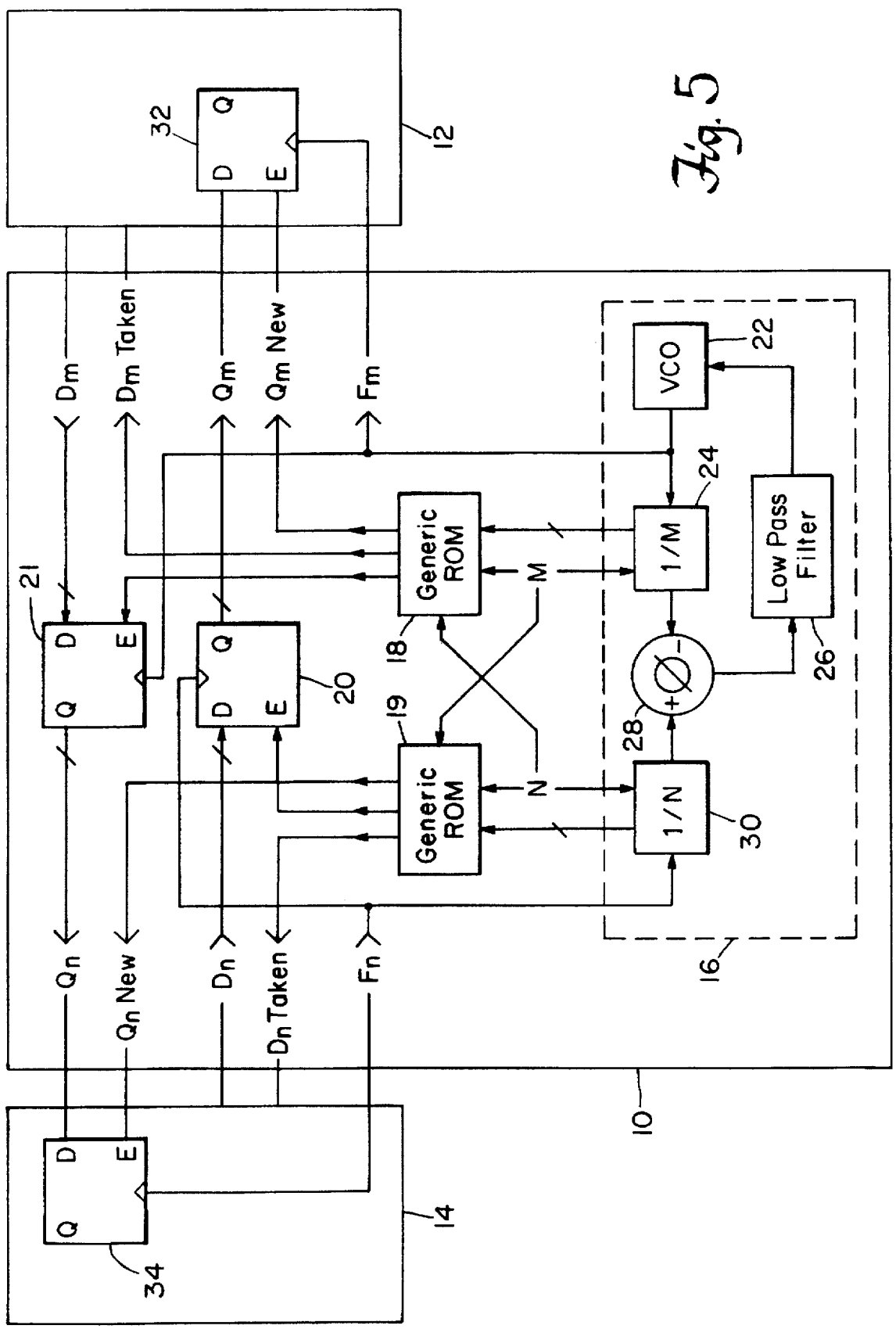
FIG. 5 is a third embodiment of the interface.

This generality is useful in making the lookup tables generic as shown in FIG. 5. The lookup tables are made generic by feeding M and N into their respective counters and into both of the lookup table address inputs. This makes the lookup tables generic in that each is identical to the other. Thus, the lookup tables can be used for a variety of ratios of M/N. The preferred lookup table for this embodiment and the preferred embodiment are shown as a read only memory (ROM) but may also be any suitable combinatorial logic device such as a RAM, EPROM, ERAM, PAL and PLA.

Figure 6:
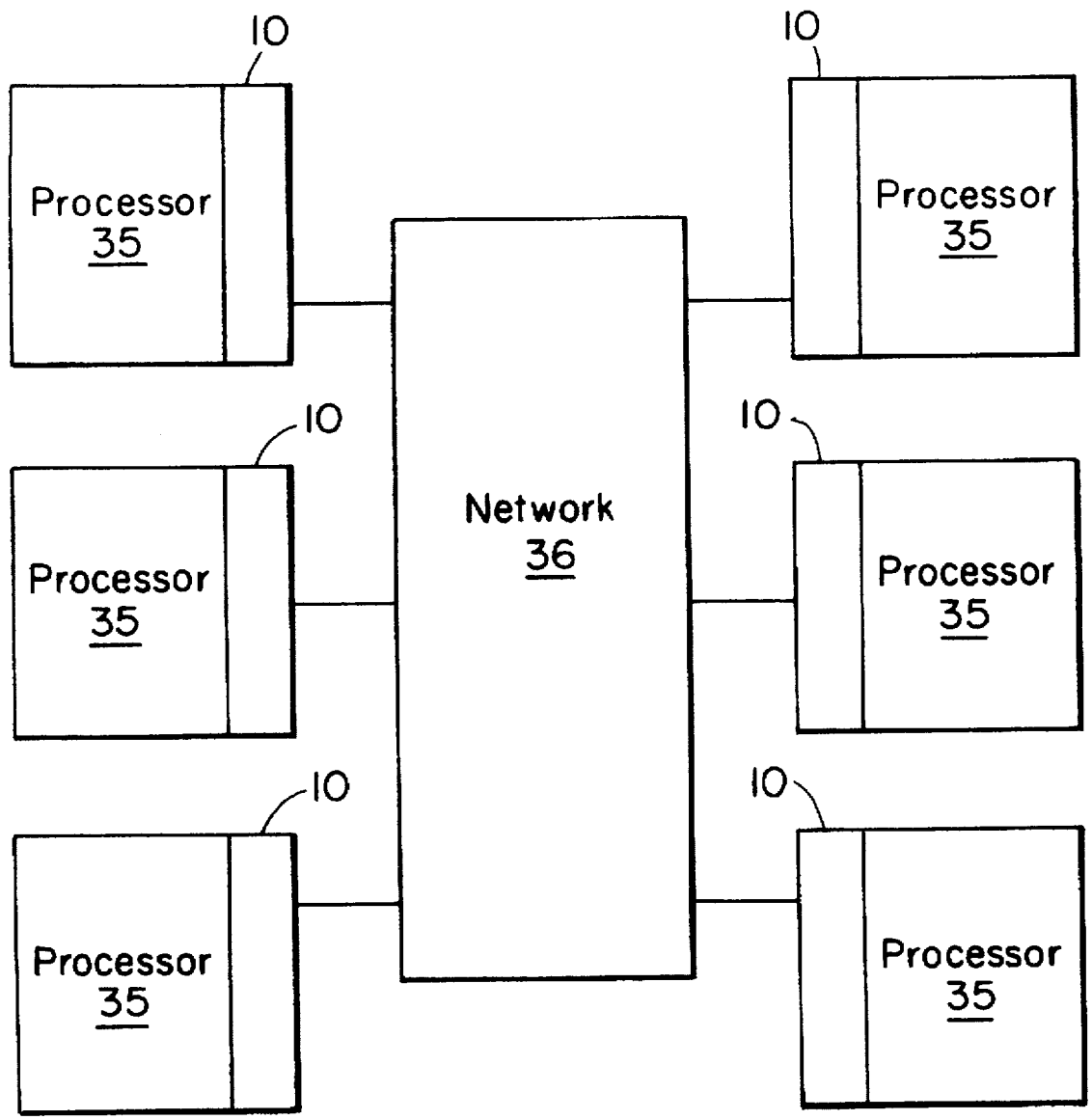
FIG. 6 is a block diagram of the rationally clocked communication interface in a data processing network.

Another embodiment of the rationally clocked interface 10 is in a data processing network as shown in FIG. 6. The data processing network includes a plurality of processors 35 connected to a network 36. Each processor has a rationally clocked interface 10 for facilitating communication between the processors and the network. In this embodiment, the interface 10 in each processor generates a clock from the network's clock via the phase locked loop. This sets up a master/slave clock relation between the network and processors. From the master/slave clock relationship, cycles of invalid and valid periods for communicating data between processors are identified. These periods are then scheduled into the lookup tables. The lookup tables are used by the interfaces to predict times when communication can occur. The lookup tables and the communication registers facilitate communication between the processors in accordance with these periods. Thus, communication between the plurality of processors and the network can occur efficiently and in a uniform manner regardless of their unequal clock frequencies. Although FIG. 6 shows six processors in the network, the interface of the present invention can work with an unlimited number of processors.

While the invention has been particularly described in conjunction with a preferred embodiment thereof, it will be understood that many alternatives, modifications and variations will be apparent to those skilled in the art without departing from the spirit and scope of the invention as defined by the appended claims. For example, although the various circuit elements are shown in an interface block, they may be included in either of the processing units or be distributed between them. Also, the invention has been described relative to communication between a master clocked unit and a slave clocked unit. Communication may be similarly controlled between slave clocked units which are the slave of a common master clock. Further, the communication registers may be clocked by the receiver clock rather than the transmitter clock.

We claim:

1. A data processing system comprising processing units, operating at different frequencies, which communicate with each other, the system comprising:

a master clock source for providing a master clock signal;

a slave clock source associated with at least one of the processing units for generating a slave clock signal for the processing unit from the master clock signal, each of the processing units having communications clocked by the master clock signal or a slave clock signal generated from the master clock signal;

a predictor associated with each of the processing units for identifying valid and invalid clock transitions according to the relationship between the slave clock signal and the master clock signal; and a communication register associated with each direction of communication between the processing units, the register being clocked by the master clock signal or the slave clock signal, the register being inhibited when a clock transition is identified as one of said invalid clock transitions by the predictor and the register being enabled when a clock transition is identified as one of said valid clock transitions by the predictor.

2. A data processing system as claimed in claim 1 wherein the master clock is a network clock and one of the processing units is the network.

3. A data processing system as claimed in claim 1 wherein the slave clock signal is generated from the master clock signal as $$F_m = \frac{M}{N} F_n$$

wherein $F_m$ is the slave clock frequency, $F_n$ is the master clock frequency, and M and N are integers.

4. A data processing system as claimed in claim 3 wherein $F_m$ is generated in a phase locked loop having a divide-by-N counter frequency dividing the master clock signal applied to a phase detector and a divide-by-M counter frequency dividing the slave clock signal applied to the phase detector, each predictor responding to the count of a respective counter.

5. A data processing system as claimed in claim 1 wherein invalid clock transitions represent timing violations that can generate metastable states.

6. A data processing system as claimed in claim 1 wherein invalid clock transitions provide flow control between fast and slow processing units.

7. A data processing system as claimed in claim 1 wherein the predictor generates data taken signals to a transmitting processing unit and new data signals to a receiving processing unit.

8. A method for arranging communication in a data processing system having at least two processing units of unequal clock frequency, comprising the steps of:

providing a master clock signal;

generating at least one slave clock signal from the master clock signal, each of the processing units having communications clocked by the master clock signal or a slave clock signal;

identifying predefined valid and invalid periods of communicating data between the processing units, the valid and invalid periods being predefined according to a predetermined relationship of the master clock and the slave clock;

communicating data between the processing units during said valid periods; and inhibiting communication of data between the processing units during said invalid periods.

9. A method according to claim 8, wherein the slave clock signal is generated from the master clock signal as $$F_m = \frac{M}{N} F_n$$

where $F_m$ is the slave clock frequency, $F_n$ is the master clock frequency and M and N are integers.

10. A method according to claim 9, wherein $F_n$ is generated in a phase locked loop having a divide-by-N counter frequency dividing the master clock signal applied to a phase detector and a divide-by-M counter frequency dividing the slave clock signal applied to the phase detector.

11. A method according to claim 8, wherein valid transitions occur during a stable state and invalid transitions occur during timing violations that can generate metastable states.

12. A method for arranging communication between synchronous systems, each having clocks of unequal clock frequency, comprising the steps of:

synchronizing the clocks together to generate one clock from the other;

identifying predefined valid and invalid periods of the generated clock for communicating data between the systems, the valid and invalid periods being predefined according to a predetermined relationship between the synchronized clocks;

communicating data between the systems for valid periods; and inhibiting communication between the systems for invalid periods.

13. A method according to claim 12, wherein the identifying step includes selecting contamination delay and propagation delay points during transmission stages, the contamination delay and propagation delay points indicating that data is unstable and not ready for transmission.

14. A method according to claim 13, further including the step of identifying setup time and hold time points for reception stages, the setup time and hold time points indicating that data is ready to be received.

* * * * *

UNITED STATES PATENT AND TRADEMARK OFFICE
CERTIFICATE OF CORRECTION

PATENT NO. : 5,634,041
DATED : May 27, 1997
INVENTOR(S) : Gill A. Pratt and Stephen A. Ward It is certified that error appears in the above-indentified patent and that said Letters Patent is hereby corrected as shown below:

Column 1, line 3, insert the following:

---GOVERNMENT SUPPORT

This invention was made with government support under Contract Number DABT63-93-C-0008 awarded by the Department of the Army (Fort Huachuca). The government has certain rights in the invention.---

Signed and Sealed this

Second Day of September, 1997

Attest:

Attesting Officer

BRUCE LEHMAN
Commissioner of Patents and Trademarks